Oct. 3, 1967 W. R. MURPHY 3,344,527
SUBSTANTIALLY LINEAR OUTPUT GAGE DEVICE
Filed Feb. 2, 1965
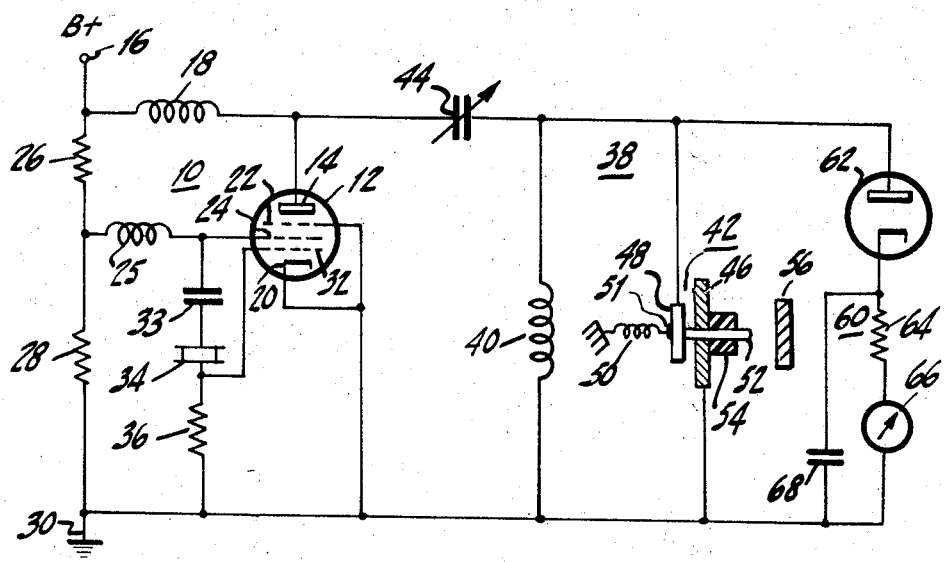
INVENTOR.
WALTER R. MURPHY
BY Edward J. Norton
Attorney

3,344,527
SUBSTANTIALLY LINEAR OUTPUT GAGE DEVICE
Walter R. Murphy, Northville, Mich., assignor to Radio Corporation of America, a corporation of Delaware
Filed Feb. 2, 1965, Ser. No. 429,721
4 Claims. (Cl. 33—172)

This invention relates to gaging apparatus and, more particularly, to such apparatus in which a voltage indication of a dimension of a workpiece varies linearly with the dimension.

A gage which provides an electrical indication which varies linearly with the change in the dimension of a work piece is useful in many branches of mechanics since the electrical indicator can be positioned conveniently at a desired location. Such gages should be accurate, should be readily calibratable, and should hold their calibration for a long period of time. It is advantageous to provide an indication which varies in direct proportion or linearly with the gaged dimension, since the indicia on the scale of the indicator that indicate consecutive changes in the gaged dimension can be spaced uniformly. This uniformity permits the scale to be read more accurately and more easily than where the indicia are more crowded in certain portions of the scale than in others. Furthermore, when a voltage level detector, such as a multivibrator, is used as an indicator, the voltage level detector will have the same resolution when set to detect various levels of voltage.

It is an object of this invention to provide an improved gaging device.

It is a further object of this invention to provide a gaging device having a remotely positionable indicator that is accurate, that is easily calibrated, and that holds its calibration for a relatively long period of time.

A further object of this invention is to provide a gage device whose indicator can be a remotely positionable voltmeter and in which the voltage applied to the voltmeter varies linearly with the dimension to be gaged.

It is a further object of this invention to provide a gage device for gaging a plurality of ranges of dimensions, and in which variations in range do not vary the linearity of the scale reading.

In accordance with this invention, a source of constant frequency, constant amplitude oscillations is provided. The oscillations are applied through a coupling capacitor to a parallel tuned circuit tunable over a range of frequencies. The oscillator frequency is chosen so that it differs from the resonant frequency of the tuned circuit throughout the range of resonant frequencies thereof. The variable element of the tuned circuit is in the form of a capacitor having two parallel plates which are moved apart a distance corresponding to the dimension of the workpiece to be gaged. The resonant frequency of the tuned circuit is varied according to the spacing of the two parallel plates resulting in a voltage appearing across the tuned circuit which varies linearly with the variation in gaged dimension.

The novel features of the invention both as to its organization and method of operation as well as additional objectives and advantages thereof, will be understood more readily from the following description, when read in conjunction with the accompanying drawing, in which The single figure of the drawing is a circuit diagram of one embodiment of a gaging apparatus constructed according to this invention.

In accordance with this invention, a constant frequency, constant amplitude oscillator 10 is provided. The oscillator 10 can comprise a pentode vacuum tube 12 whose anode 14 is connected to the positive terminal 16 of a source of unidirectional potential (not shown) through an inductance 18 which acts as a choke coil for signal energy of the frequency produced by the oscillator 10. The cathode 20 and the supressor grid 22 of the tube 12 are connected to system ground 30. The screen grid 24 of the tube 12 is connected through a radio frequency choke 25 to the junction point of two resistors 26 and 28. The two resistors 26, 28 are connected in series between the terminal 16 and system ground 30. The screen grid 24 is also connected to the control grid 32 of the tube 12 through a capacitor 33 and through a piezo-electric crystal 34 in series, the control grid 32 also being connected to system ground 30 through a resistor 36. Oscillations produced by the oscillator 10, whose frequency is under control of the piezo-electric crystal 34, appear at substantially constant amplitude and substantially constant frequency, by electron coupling, on the anode 14. Variations in load, or in reactance of the load, vary the amplitude and the frequency of the produced oscillations of the oscillator 10 little if at all. A detailed description of the operation of the oscillator 10 shown by way of example can be found in the art.

The load on the oscillator 10 comprises a tuned circuit 38 including an inductor 40 and a variable capacitor 42 connected in parallel. One terminal of the tuned circuit 38 is connected to system ground 30 and the other terminal of the tuned circuit 38 is connected through a variable, coupling capacitor 44 to the anode 14.

The capacitor 42 comprises two conductive plates 46 and 48, one of which 46 is relatively fixed in position. The other plate 48 can be moved away from the fixed plate 46 by a workpiece (not shown) a dimension of which is to be gaged. A spring 50, which is connected to but insulated from the plate 48 by means of an insulator 51, is provided to urge the movable plate 48 towards the fixed plate 46. An insulated bushing (not shown) may provide additional support of the movable plate 48, if necessary.

The moving means for the movable plate 48 is shown as including a nonconductive rod 52 which extends through an insulating support bushing 54, mounted in any suitable manner, and through a hole in the fixed plate 46. The rod 52 is fixed at one end to the movable plate 48. The rod 52 can, if desired, be made of metallic, conductive material for reasons of strength. In such applications, suitable means are required to insulate the rod 52 from the plate 48 and spring 50. The work piece (not shown) is moved in contact with a fixed backup plate 56 and the other end of the rod 52 in a manner to move the rod 52 away from the plate 56. Therefore, the capacitor plates 46, 48 are separated an amount linearly related to the dimension of the work piece in a direction along the length of the push rod 52. Since the tuning capacitor 42 has only two plates 46, 48 that are moved away from each other, the capacity of the tuned capacitor 42 is changed by an amount varying inversely with the distance between the plates 46 and 48. The fixed frequency of the oscillator 10 and the range of resonant frequencies of the tuned circuit 38 are so chosen that the frequency of the oscillator 10 falls on the side of the amplitude vs. frequency curve of the tuned circuit 38 at all adjustments of the tuning capacitor 42. That is, the frequency of the oscillator 10 differs from the resonant frequency of the tuned circuit 38 throughout the range of tuning thereof upon variation of the value of the capacitor 42. The voltage appearing across the tuned circuit 38 indicates the dimension to be gaged.

The amplitude of this voltage can be indicated by an indicator means 60 which is connected across the tuned circuit 38. This indicator 60 comprises, by way of example, a diode rectifier tube 62 whose anode is connected to the terminal of the tuned circuit 38 that is connected to the coupling capacitor 44. The cathode of the diode 62 is connected to system ground 30 through a load resistor 64 and a voltmeter 66 in series. The series combination of the resistor 64 and the meter 66 is by-passed by an integrating capacitor 68.

As will be shown, the voltage amplitude of the wave appearing across the tuned circuit 38 varies linearly with the distance between the plates 46 and 48 and therefore with the dimension of the work piece to be gaged, this linearity being provided by selection of the value of the inductor 40. Furthermore, the voltage appearing across the tuned circuit 38 varies with the capacity of the variable capacitor 44, whereby several ranges of indication may be provided by this same voltmeter 66. In addition, the variation of the capacitor 44 does not vary the linearity of the voltage vs. dimension relation mentioned above, and the choice of the inductance of the inductor 40 does not vary the range of indication so long as the product of the inductance 40 and capacity 44 and the square of the expression two pi times the frequency of the source of oscillation is equal to one as will be shown.

It is to be noted that the constant frequency, constant amplitude oscillator 10 is coupled to the variable tuned circuit 38 by means of a coupling capacitor 44. As will be shown, this linear relation between the distance between the plates 46 and 48 and the voltage across the tuned circuit 38 does not exist when an element other than a capacitor 44 is used as the coupling element.

Let $$C_{42} = \frac{K_1}{d} \text{ and } C_{44} = K_2$$

where $C_{42}$ and $C_{44}$ are respectively the capacities of the capacitors 42 and 44, and $d$ is the distance between the plates 46 and 48 of the capacitor 42 while $K_1$ and $K_2$ are constants.

Then $$X_{C_{42}} = \frac{d}{K_1 \omega}$$

$$X_{C_{44}} = \frac{1}{\omega K_2}$$

$$X_{L_{40}} = \omega L_{40}$$

$X_{C_{42}}$ being the reactance of the capacitor 42 at a frequency $f$, $X_{C_{44}}$ being the reactance of the capacitor 44 at the frequency $f$, and $X_{L_{40}}$ being the reactance of the inductor 40 at the frequency $f$, $\omega$ being equal to $2\pi f$ and $\omega$ being constant.

The impedance $Z_1$ across the parallel tuned circuit 38 is equal to $$\frac{(J\omega L_{40})\frac{(-Jd)}{K_1\omega}}{J\left(\omega L_{40} - \frac{d}{K_1\omega}\right)} = \frac{-J\omega L_{40} d}{\omega^2 K_1 L_{40} - d} \quad (1)$$

where J is equal to the square root of minus one.

Then the voltage $E_o$ at the junction of the coupling capacitor 44 and the tuned circuit 38 will be $$E_o = E_i \frac{\frac{-J\omega L_{40} d}{\omega^2 K_1 L_{40} - d}}{\frac{-J\omega L_{40} d}{\omega^2 K_1 L_{40} - d} + -J\frac{1}{\omega K_2}} \quad (2)$$

wherein $E_1$ is the A.C. voltage across the constant frequency oscillator 10.

Thus $$E_o = E_i \frac{-J\omega L_{40} d (\omega K_2)}{-J\omega K_2 \omega L_{40} d - J\omega^2 K_1 L_{40} + Jd} \quad (3)$$

If $\omega$, $K_2$ and $L_{40}$ are chosen such that $$\omega^2 K_2 L_{40} = 1$$

Then $$E_o = \frac{E_i d K_2}{K_1}$$

$$= E_i d K_o$$

where $$K_o = K_2/K_1$$

or the output voltage $E_o$ is linearly related to the displacement $d$.

That is, when the coupling element between the oscillator 10 and the tuned circuit 38 is a capacitor, certain parameters which include the value of the inductor 40 but which does not include the value of the capacitor 44 can be so chosen that the voltage developed across the tuned circuit is linearly related to the displacement between the plates of the capacitor. It should be further noted that when either a resistor or an inductor is substituted for the coupling element 44, this linear relation no longer exists. This is due to the fact that the term $$-J\frac{1}{\omega K_2}$$

in Equation 2 hereinabove becomes R if a resistor is used as a coupling element, and this term becomes $J\omega L$ if an inductor is used as a coupling element. Equation 2 so modified cannot be reduced to a form in which $E_o$ is linearly related to $dE_1$ by the choice of parameters. Furthermore, if the value of the capacitor 44 is varied, the output of the oscillator divides across the capacitor 44 and the tuned circuit 38 in a different manner, whereby the calibration of the volt meter and therefore the range of indication thereof is varied. Finally, since the oscillator 10 provides a substantially unvarying frequency and amplitude of output, the various calibrations remain constant for a relatively long period of time.

Although only a single gaging apparatus has been described, it will undoubtedly be apparent to those skilled in the art that variations thereof are possible within the spirit of the present invention. For example, solid state devices may be used instead of the tubes 12 and 62. Or any constant frequency, constant amplitude oscillator may be used rather than the one shown. Or, any gaging capacitor of which the capacity varies inversely as a distance to be gaged may be used for the capacitor 42. Hence it will be understood that the foregoing description is to be considered as illustrative and not in a limiting sense.

What is claimed is:

1. Dimension gaging apparatus comprising:
   a constant frequency oscillator having a high and low alternating potential terminal;
   a coupling capacitor;
   a tuned circuit comprising an inductance and a variable capacitor connected in parallel;
   a connection between said high alternating potential terminal through said coupling capacitor to a point on said tunable circuit;
   a second connection between said low alternating potential terminal to a different point on said tunable circuit;
   said variable capacitor comprising two parallel plates and means to move one plate with respect to the other thereof by an amount depending on the dimension to be gaged;
   means to indicate the voltage developed across said tunable circuit, the impedance of said coupling capacitor being chosen in relation to the impedance of said inductor and further in relation to the frequency of said oscillator such that said voltage is substantially linearly related to the relative distance between said plates.

2. Dimension gaging apparatus comprising:
   a constant frequency constant amplitude source of oscillations having a pair of output terminals;
   a two terminal tunable circuit comprising an inductor and a two plate capacitor in parallel;

a connection from one terminal of said oscillator to one terminal of said tunable circuit;

a second connection from the other terminal of said oscillator through a coupling capacitor to the other terminal of said tunable circuit;

said inductor and said coupling capacitor being so chosen that the product of the inductance of said inductor and the capacity of said coupling capacitor and the square of the expression two pi times the frequency of said source of oscillation is equal to one;

means for varying the distance between said plates in accordance with a dimension to be gaged to cause the voltage across said tunable circuit to vary substantially linearly with said dimension to be gaged; and means to indicate said voltage across said tunable circuit.

3. Dimension gaging apparatus for providing a voltage which varies substantially linearly in accordance with a dimension to be gaged comprising:

a constant frequency constant voltage amplitude oscillator producing oscillations of a predetermined frequency and having a pair of output terminals;

a two terminal, tunable resonant circuit comprising an inductor and a variable capacitor connected in parallel;

said capacitor including only two parallel plates;

the range of resonant frequency of said tunable circuit and said predetermined frequency being so related that said predetermined frequency differs from the resonant frequency of said tunable circuit at all tunings thereof;

a connection between one terminal of said oscillator and one terminal of said tunable circuit;

a second connection from the other terminal of said oscillator to the other terminal of said tunable circuit through a coupling capacitor;

said inductor and said coupling capacitor being so chosen that the product of the inductance of said inductor and the capacity of said coupling capacitor and the square of the expression two pi times the frequency of said source of oscillation is equal to one;

means for varying the distance between said plates in accordance with said dimension to be gaged to cause the voltage across said tunable circuit to vary substantially linearly with said dimension to be gaged; and means to indicate said voltage across said tunable circuit.

4. Dimension gaging apparatus for providing a voltage which varies substantially linearly in accordance with a dimension to be gaged comprising:

a constant frequency constant voltage amplitude oscillator producing oscillations of a predetermined frequency and having a pair of output terminals;

a two terminal, tunable circuit comprising an inductor and a variable capacitor connected in parallel;

said capacitor including only two parallel plates;

the range of resonant frequency of said tunable circuit and said predetermined frequency being so related that said predetermined frequency differs from the resonant frequency of said tunable circuit at all tunings thereof;

a connection between one terminal of said oscillator and one terminal of said tunable circuit;

a second variable capacitor;

a second connection coupling the other terminal of said oscillator to the other terminal of said tunable circuit through said second variable capacitor;

said inductor and said second variable capacitor being so chosen that the product of the inductance of said inductor and the capacity of said second capacitor and the square of the expression two pi times the frequency of said source of oscillation is equal to one;

means for varying the distance between said plates in accordance with the dimension to be gaged to cause the voltage across said tunable circuit to vary substantially linearly with the dimension to be gaged;

means to indicate said voltage across said tunable circuit with variation of said second variable, coupling capacitor varying the range of dimensions indicated without varying the linearity of said indications.

References Cited

UNITED STATES PATENTS

| | | | |
|---|---|---|---|
| 2,824,281 | 2/1958 | Radnor | 324—61 |
| 2,913,829 | 11/1959 | Arlin | 33—147 |
| 3,000,101 | 9/1961 | Giardino | 33—143 |
| 3,031,617 | 4/1962 | Paquette | 324—61 |

OTHER REFERENCES

Mechanical Measurements by Electrical Methods, by Howard C. Roberts, The Instruments Publishing Co., Inc., Pittsburgh, 1951 (p. 12 relied on).

Instruments, vol. 18, 1945 (p. 88 relied on).

LEONARD FORMAN, *Primary Examiner.*

J. M. FREED, *Assistant Examiner.*